US008823707B2

(12) United States Patent
Barcay et al.

(10) Patent No.: US 8,823,707 B2
(45) Date of Patent: Sep. 2, 2014

(54) GUIDED NAVIGATION THROUGH GEO-LOCATED PANORAMAS

(75) Inventors: Daniel Barcay, San Francisco, CA (US); Gokul Varadhan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 52 days.

(21) Appl. No.: 13/302,470

(22) Filed: Nov. 22, 2011

(65) Prior Publication Data

US 2012/0127169 A1    May 24, 2012

Related U.S. Application Data

(60) Provisional application No. 61/417,120, filed on Nov. 24, 2010.

(51) Int. Cl.
*G06T 15/20*  (2011.01)
*G06T 19/00*  (2011.01)
*G06F 3/0481*  (2013.01)

(52) U.S. Cl.
CPC .............. *G06T 19/00* (2013.01); *G06T 15/20* (2013.01)
USPC ........................................................ 345/427

(58) Field of Classification Search
CPC ...... G06T 15/20; G06T 19/00; G06F 3/04815
USPC ........................................................ 345/427
See application file for complete search history.

(56) References Cited

U.S. PATENT DOCUMENTS

| 2006/0146123 A1* | 7/2006 | Sorokin et al. | 348/14.05 |
| 2008/0291217 A1* | 11/2008 | Vincent et al. | 345/629 |
| 2009/0213112 A1* | 8/2009 | Zhu et al. | 345/419 |
| 2010/0118116 A1* | 5/2010 | Tomasz et al. | 348/36 |

OTHER PUBLICATIONS

Goesele et al., "Multi-View Stereo for Community Photo Collections", Oct. 21, 2007, Computer Vision, pp. 1-8.*
Kopf et al., "Street Slide: Browsing Street Level Imagery", Jul. 2010, ACM Transactions on Graphics, pp. 1-8.*
Chen, "QuickTime® VR—An Image-Based Approach to Virtual Environment Navigation", Aug. 11, 1995, Computer Graphics Proceedings, pp. 29-38.*
McCrae et al., "Multiscale 3D Navigation", Mar. 1, 2009, Interactive 3D Graphics and Games 2009, pp. 7-14.*
International Search Report and Written Opinion for International application No. PCT/US2011/061906, mailed on May 16, 2012, 19 pages.

(Continued)

*Primary Examiner* — Xiao Wu
*Assistant Examiner* — Matthew D Salvucci
(74) *Attorney, Agent, or Firm* — Dority & Manning, P.A.

(57) ABSTRACT

A capability for guided navigation in an interactive virtual three-dimensional environment is provided. Such a capability may enhance user experience by providing the feeling of free-form navigation to a user. It may be necessary to constrain the user to certain areas of good visual quality, and subtly guide the user towards viewpoints with better rendering results without disrupting the metaphor of freeform navigation. Additionally, such a capability may enable users to "drive" down a street, follow curving roads, and turn around intersections within the interactive virtual three-dimensional environment. Further, this capability may be applicable to image-based rendering techniques in addition to any three-dimensional graphics system that incorporates navigation based on road networks and/or paths.

27 Claims, 9 Drawing Sheets

(56) References Cited

OTHER PUBLICATIONS

Anguelov et al., "Google Street View: Capturing the World at Street Level," *Computer*, published by the IEEE Computer Society, vol. 43, No. 6, Jun. 2010, pp. 32-28.

Geraerts, Roland, "Camera Planning in Virtual Environments Using the Corridor Map Method," *Motion in Games*, LNCS 5884, Springer-Verlag Berlin Heidelberg 2009, Nov. 21, 2009, pp. 194-206.

Nurminen, Antti and Antti Oulasvirta, "Designing Interactions for Navigation in 3D Mobile Maps," *Map-based Mobile Services: Design, Interaction and Usability*, Springer, Lecture Notes in Geoinformation and Cartography, London, 2008, pp. 198-224.

* cited by examiner

GUIDED NAVIGATION THROUGH GEO-LOCATED PANORAMAS

CROSS-REFERENCE TO RELATED APPLICATIONS

This patent application claims the benefit of U.S. Provisional Patent Application No. 61/417,120, filed Nov. 24, 2010, entitled "Guided Navigation Through Geo-Located Panoramas", which is incorporated herein by reference in its entirety.

BACKGROUND

1. Field

Embodiments relate generally to three-dimensional graphics.

2. Background

Systems exist for navigating through a three-dimensional environment to display three-dimensional data. The three dimensional environment includes a virtual camera that defines what three dimensional data to display. The virtual camera has a perspective according to its position and orientation. By changing the perspective of the virtual camera, a user can navigate through the three dimensional environment.

A geographic information system is one type of system that uses a virtual camera to navigate through a three-dimensional environment. A geographic information system is a system for storing, retrieving, manipulating, and displaying a substantially spherical three-dimensional model of the Earth. The three-dimensional model may include satellite imagery, maps, models of buildings and terrain, and other geographic features. Further, the three-dimensional environment may be used to display geo-located photographs of real world scenes corresponding to various geographic locations. For example, the geo-located photographs may correspond to a network of streets of a major metropolitan city. Such photographs may also include panoramic images that provide 360-degree street-level views.

The virtual camera in the geographic information system may view the spherical three-dimensional model of the Earth from different perspectives. An aerial view of the model of the Earth may show satellite images, but the terrain and buildings may not be displayed. On the other hand, a ground-level view of the model may show the terrain and buildings in detail. However, some views of the model may not be accurate or visually acceptable representations of the image content displayed by the GIS. For example, a photographic image displayed in the GIS may be accurate from only a single viewpoint or range of viewpoints based on, for example, the position of the camera used to capture the image. In conventional systems, navigating between different views of an image in a three-dimensional environment may become difficult and visually unappealing to a user.

BRIEF SUMMARY

A capability for guided navigation in an interactive virtual three-dimensional environment is provided. Such a capability may enhance user experience by providing the feeling of free-form navigation to a user. It may be necessary to constrain the user to certain areas of good visual quality, and subtly guide the user towards viewpoints with better rendering results without disrupting the metaphor of freeform navigation. Additionally, such a capability may enable users to "drive" down a street, follow curving roads, and turn around intersections within the interactive virtual three-dimensional environment. Further, this capability may be applicable to image-based rendering techniques in addition to any three-dimensional graphics system that incorporates navigation based on road networks and/or paths.

In an embodiment, a three-dimensional mesh of polygons for a first panoramic image and a second panoramic image is generated based on depth values associated with various points within a scene represented in the respective first and second panoramic images. The first panoramic image includes a link to the second panoramic image. The link represents an obstruction-free path (e.g., a street) that connects the panoramic images in three-dimensional space. A region of sufficient visual quality for each of the first and second panoramic images in the three-dimensional mesh is determined. The region of sufficient visual quality can be based on the depth values and may correspond to viewpoints from which the three-dimensional mesh can be rendered so as to be a visually accurate representation of the image objects in the first and second panoramic images. A navigation radius is then calculated for each of the first and second panoramic images based on the determined region of visual quality of each of the first and second panoramic images. A navigation channel relative to a path between the first and second panoramic images in the three-dimensional mesh is created based on the calculated navigation radius of each of image. The navigation channel is used to define a bounded volume of space within the three-dimensional environment in which a virtual camera can be moved. The navigation channel ensures that visual quality is maintained as the virtual camera moves between different viewpoints in the three-dimensional environment.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

Figure 6A:
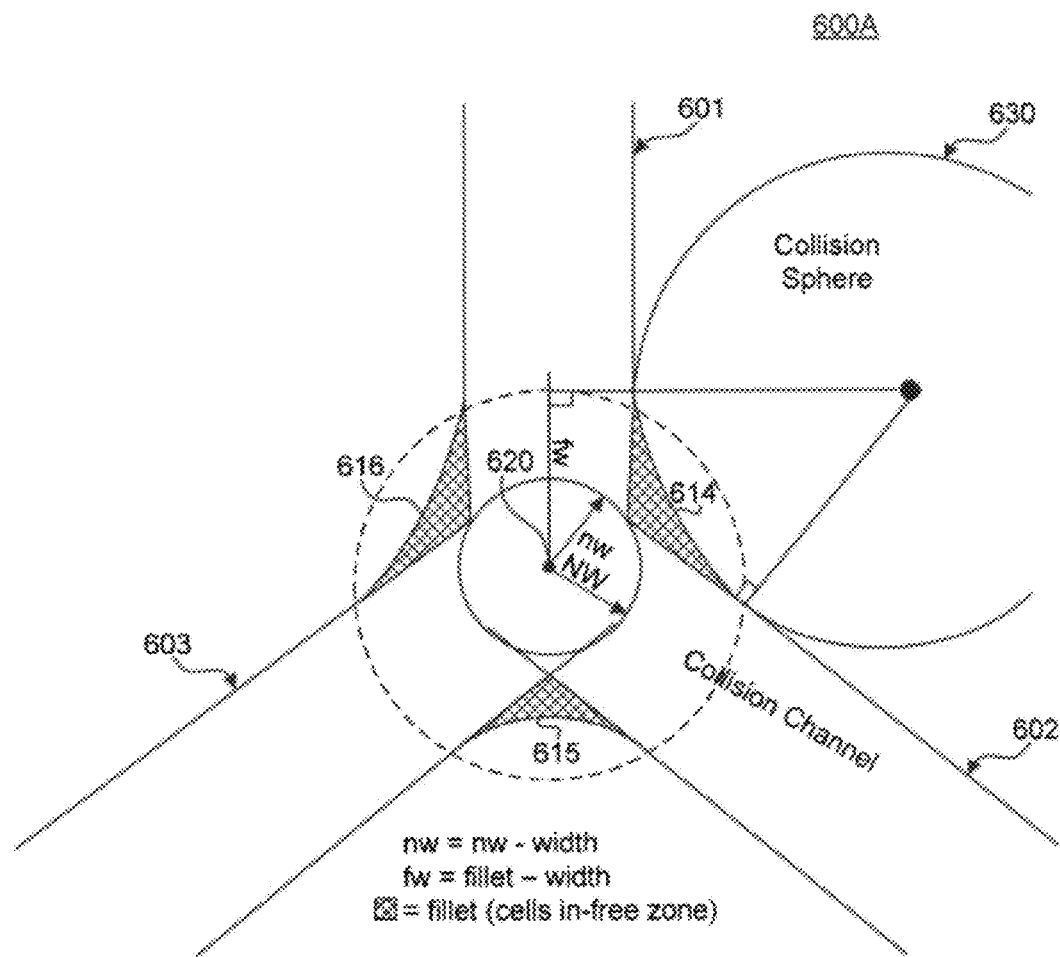
Figure 6B:
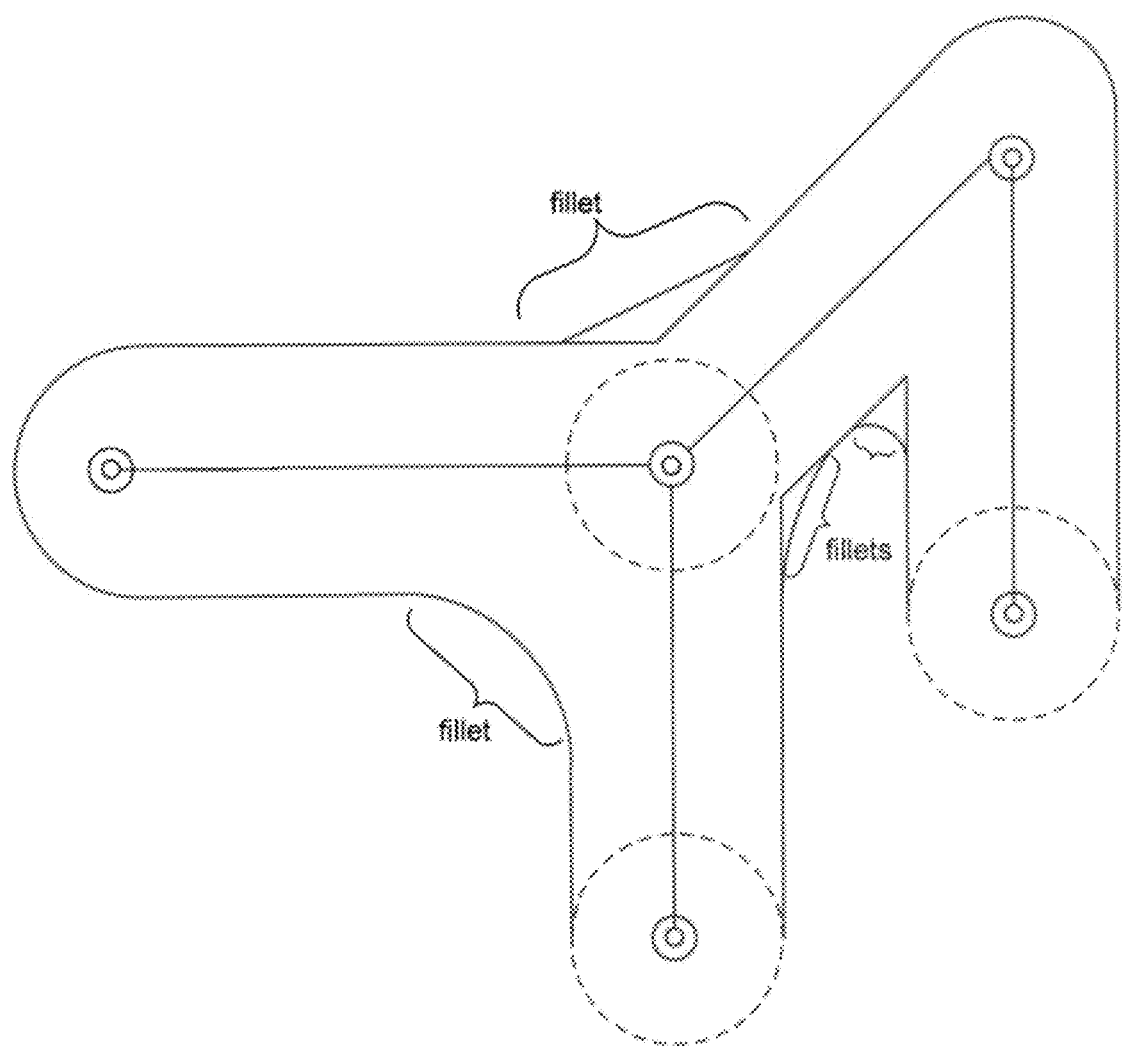

FIGS. 6A-B are diagrams illustrating the intersection of multiple navigation channels, according to an embodiment.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Embodiments relate to guided navigation in an interactive virtual three-dimensional environment. While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The terms "panoramic image" and "panorama" are used herein to refer broadly and inclusively to any panoramic images that provide a 360-degree view of a real world scene. Panoramas or panoramic images may be stored in the form of a plurality of panoramic images or panoramic image tiles. Such panoramas may further include three-dimensional images, including panoramic three-dimensional images that can be presented on a display. Such a display can be any type of electronic display for viewing images or can be any type of rendering device adapted to view three-dimensional images. Further, each panoramic image may be associated with depth information corresponding to various points within a scene represented by the image. As will be described in further detail below, this depth information can be used to generate three-dimensional geometry for the panoramas.

System for Guided Navigation Along a Street Network

Figure 1:
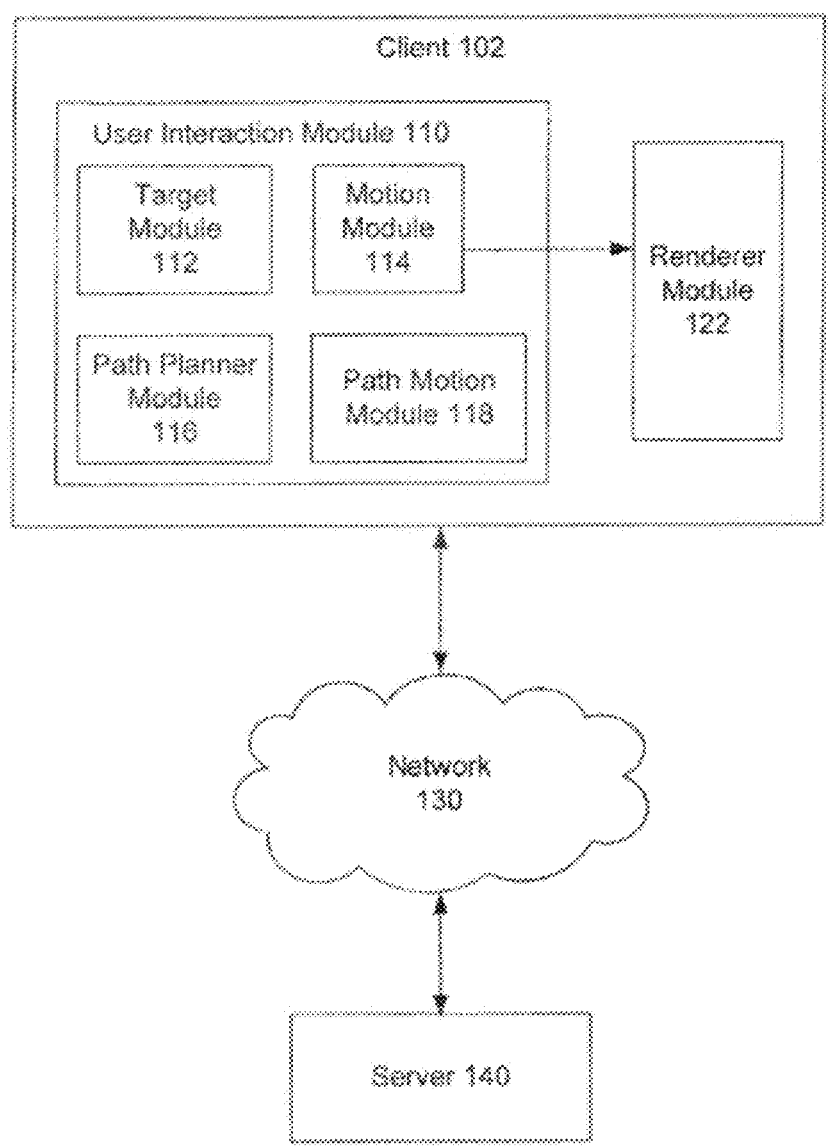
FIG. 1 is a diagram illustrating a system for guided navigation along a street network, according to an embodiment.

FIG. 1 is a diagram illustrating a system 100 for guided navigation along a street network, according to an embodiment. System 100 includes a client 102 communicatively coupled to a server 140 across a network 130. Network 130 can be any network or combination of networks that can carry data communication. Such network can include, but is not limited to, a local area network, medium area network, and/or wide area network such as the Internet.

Client 102 can be any computing device with a processor, local memory, a display, and one or more input devices (e.g., a mouse, QWERTY keyboard, touch-screen, microphone, joystick, or T9 keyboard). Such a computing device can include, but is not limited to, a mobile phone, a personal digital assistant (PDA), a computer, a cluster of computers, a set-top box, or other similar type of device capable of processing instructions. Server 140, similarly, can be implemented using any general-purpose computer capable of serving data to client 102. Although only server 140 is shown, any number of servers may be used as necessary.

In an embodiment, client 102 includes a user interaction module 110 and a renderer module 122. User interaction module 110 includes a target module 112, a motion module 114, a path planner module 116, and a path motion module 118. Embodiments of user interaction module 110, renderer module 122, motion model 114, target module 112, path planner module 116, and path motion module 118 may be implemented in hardware, software, firmware, or any combination thereof.

For ease of explanation and illustrative purposes, embodiments of system 100 and its components will be described in the context of a geographic information system (GIS) operating in a client-server computer architecture, but embodiments are not intended to be limited thereto. Such a GIS can be used to render and navigate photographic panoramas in a virtual three-dimensional environment from the perspective of a virtual camera, as will be described in further detail below. An example of such a GIS includes, but is not limited to, Google Earth from Google Inc. of Mountain View, Calif.

Accordingly, client 102 may include a geospatial browser (not shown) configured to provide an interface to the GIS. Such a geospatial browser can be a standalone client application executable by client 102 or operable as a plug-in of an web or Internet browser. In an example, server 140 is a GIS server configured to transmit GIS data corresponding to a geographic region of interest on a substantially spherical representation of the Earth. For example, a request may include a bounded geographic search area in the form of a bounding box having latitude/longitude data points associated with a geographic location. In response to receiving the request, server 140 may communicate with a database or one or more different servers to which server 140 is communicatively coupled over a network (e.g., network 130). Such GIS data may include both image and non-image data. Image data may include, but is not limited to, satellite imagery, digital maps, aerial photographs, and street-level photographs. Non-image data may include, for example, metadata associated with the imagery and photographs.

In an embodiment, the street-level photographs may include panoramas that present 360-degree views of real-world scenes. Further, each panorama may include or be associated with metadata used to specify information associated with the panorama. Such metadata may include, but is not limited to, a position of the virtual camera (e.g., yaw, pitch, and roll), GPS coordinates, and a panorama identifier (e.g., a string value that identifies the panorama in the GIS).

According to an embodiment, target module 112 determines a target location in the three-dimensional environment based on a current view direction and/or view position of the virtual camera in the three-dimensional environment. In one embodiment, target module 112 accepts an input from a user that specifies a target location, such as an address or coordinates. In another embodiment, target module 112 may receive position data representing a position on a viewport selected by a user, extend a ray based on the position selected by the user, and determine the target location to be an intersection of the ray with an object in the three-dimensional model. In an embodiment, the target position may be associated with a center of a photographic panorama (e.g., panorama center 204 of FIG. 2, described further below) in the three-dimensional environment.

Path motion module 118 moves the virtual camera in the three-dimensional environment toward the target location along the path and orients the virtual camera to face the target location as the virtual camera moves along the path. Path motion module 118 may use the path to prefetch geographic information from server 140.

Motion model 114 constructs a view specification. The view specification defines the virtual camera's viewable volume within a three dimensional space, and the position and orientation of the frustum with respect, for example, to a three dimensional map. In an embodiment, the viewable volume is defined by a view frustum (or simply "frustum"), which may be, for example, in the shape of a truncated pyramid. The frustum may have minimum and maximum view distances that can change depending on the current field of view. As a user's view of a three dimensional map is manipulated, the orientation and position of the frustum change with respect to the three-dimensional virtual environment. Thus, as user input is received, the view specification also changes. View specification may be stored, for example, in a local memory of client 102, where it is used by renderer module 122 to draw GIS data.

In accordance with one embodiment, the stored view specification specifies navigation parameters of the virtual camera. The navigation parameters can be used to specify the position and orientation of the virtual camera in three-dimensional space. Such parameters can include, but are not limited to, directional coordinates, (e.g., latitude, longitude, north, south, in-between), altitude and pitch/tilt (e.g., level, down, up, in-between), yaw/roll (e.g., level, tilt clockwise, tilt counterclockwise, in-between), horizontal field of view, and vertical field of view.

Depth Integration

In an embodiment, the photographic panorama includes depth information corresponding to various points within a scene represented by the panoramic image, according to an embodiment. The depth information can include, for example, depth values that describe the proximity of the various points in the scene to a first position. The first position can be, for example, the position of an image capturing device (e.g., a specialized digital camera) used to capture the image. In an embodiment, a surface of an object represented in the scene may be represented as a collection of points. Each point, in turn, may be represented as a vector, whereby each point is stored with respect to its distance to the image capturing device, and its angle with respect to the direction in which such an image capturing device is pointed.

The depth information may be collected in a variety of ways, including, but not limited to, using a laser range finder and image matching. In an embodiment, camera arrangements employing two or more cameras, spaced slightly apart yet looking at the same scene, may be used. According to an embodiment, image matching is used to analyze slight differences between the images captured by each camera in order to determine the distance at each point in the images. In another embodiment, the distance information may be compiled by using a single video camera, mounted on a vehicle and traveling at a particular velocity, to capture images of scenes as the vehicle moves forward. A laser range finder may also be used in combination with the camera taking the image. By using image matching, the subsequent frames of the captured images may be compared to extract the different distances between the objects and the camera. For example, image objects located at a further distance from the camera position will stay in the frame longer than image objects located closer to the camera position.

Although some formats may be more advantageous than others, embodiments are not limited to any particular format of storing the depth information. In an embodiment, the depth information is sent from a server as a depth map comprising a grid of discrete values, where each element of the grid corresponds with a pixel of a two-dimensional image. The value of the depth map at each pixel may represent the distance from a first position to an image object. For example, the value of the depth map at each pixel may represent the distance from a camera position, of the camera used to capture the image, and the image object represented in the image. It would be apparent to a person skilled in the relevant art given this description that any one of various file formats may be used for such a depth map. For example, the depth map may be stored as an extensible markup language (XML) file. In an embodiment, the depth map and other information associated with the panoramic image can be stored independently of the image itself.

According to an embodiment, a set of panoramic images can be retrieved from server 140 based on a current field of view associated with the virtual three-dimensional environment. Further, depth values associated with each panoramic image can be used to generate three-dimensional geometry for each panorama. The generated three-dimensional geometry may be, for example and without limitation, a watertight three-dimensional mesh of polygons (e.g., triangles) that can be generated and rendered by renderer module 122 with photographic textures with the three-dimensional environment in a display area of a geospatial browser implemented in client 102, as noted above.

Panorama Graph/Connectivity Information

In an embodiment, the metadata of each panoramic image includes connectivity information that specifies a spatial link, connection, or path to one or more neighboring panoramas. In an embodiment, user interaction module 110 (or any combination or sub-combination of its components) constructs a directed graph of spatially linked panoramas (or simply a "panorama graph" or a "connectivity graph") based on the connectivity information included in the metadata of each panoramic image. Such a panorama graph may be stored in, for example, a local memory (e.g., a cache memory) at client 102. In an embodiment, the panorama graph can be used to guide a user of the GIS along the links between different panoramas rendered in the three-dimensional environment. In an example, such links correspond to a street network in a virtual three-dimensional environment of the GIS and the panoramic images represent a series of different street-level views along the streets of the network. In this regard, the panorama graph can represent a network of streets or roads (or "road network") between neighboring panoramas.

Although not shown in FIG. 1, client 102 can include a graphical user interface (GUI), which can be used to provide navigation controls to enable a user to navigate along such a road network or panorama graph within the three-dimensional environment, according to an embodiment. In an embodiment, the GIS can provide controls that enable a user to navigate between various locations and viewpoints associated with the panoramic images. For example, navigation controls may be rendered as a three-dimensional overlay with a textured three-dimensional model of the panoramic image. Such navigation controls can enable the user to change the virtual camera's view position and view direction within the three-dimensional environment to navigate between locations associated with the different panoramic images.

In an embodiment, the connectivity information (i.e., the metadata), the depth information, and the photographic textures associated with each panorama can be streamed from server 140 to a client 102 over network 130. For example, the photographic textures may be streamed in the form of image tiles at different resolutions based on a viewpoint of the virtual camera in the three-dimensional environment. Further, the panoramas and any associated information may be streamed based on the viewpoint of the virtual camera.

Navigation Channel Constraints

A panorama of a street level scene may present an accurate representation of the scene from only a single point-of-view. For example, the best visual quality, or the viewpoint(s) that present the most accurate visual depiction of the scene represented in the panorama, may be associated with a location of the virtual camera within the three-dimensional environment corresponding to the exact position where the panorama was taken, i.e., corresponding to the original position of the image capturing device used to capture the panoramic image. For example, this position may correspond to the center of the panorama. Further, the visual quality of a rendered panorama in the three-dimensional environment may degrade as the virtual camera moves away from the center of the panoramas.

However, some deviation is desired so that users viewing the panorama from the perspective of the virtual camera (e.g., rendered on a display device coupled to client 102) can still experience the three-dimensional quality of the rendering. The user should also be able to use navigation controls to explore different parts of the three-dimensional space. Thus, embodiments may be configured to prevent the virtual camera from moving to viewpoints of the panorama having poor image quality when rendered in the three-dimensional environment. Moreover, as will be described in further detail below, embodiments enable the virtual camera (and the user) to follow areas of good image quality.

In an embodiment, an area or region of "known-good," sufficient, or acceptable visual quality for a panorama is based on one or more criteria associated with the visual representation of the panorama in the three-dimensional environment. In an example, the region of sufficient visual quality corresponds to a region of the panorama for which a display resolution exceeds a predetermined threshold value. In another example, such a region may be based on points within the panorama at which the display resolution is of sufficient quality so as to avoid distortion of objects in the scene represented by the panoramic image. In yet another example, such a region of the panorama may correspond to the nearest determined location of a façade plane rendered for the panorama in the three-dimensional environment.

As discussed above, a connectivity or panorama graph can be generated by user interaction module 110 using connectivity information associated with a panorama corresponding to a location in the three-dimensional environment. As will be described in further detail below, path planner module 116 uses the connectivity information associated with one or more panoramas to construct a navigation channel between the panoramas. Such a navigation channel is used to constrain the virtual camera to a certain volume of space around the nearest panoramas in the generated panorama graph.

According to an embodiment, for every panorama in the panorama graph, path planner module 116 can calculate a navigation radius or a roaming distance relative to a position of the virtual camera corresponding to the most visually accurate viewpoint from which a representation of the panorama may be viewed in the three-dimensional environment. For example, such a position may correspond to the position of an image capturing device used to capture the panorama (e.g., the center of a panorama), as mentioned previously.

The navigation radius or roaming distance may be a constant or a function, and may depend on several factors including, but not limited to, the distance between the panoramas and quality of the depth mesh. For example, path planner module 116 calculates the navigation radius for a panorama by evaluating the distance to the nearest plane to be rendered from the panorama center in the three-dimensional environment. It would be apparent to a person skilled in the relevant art given this description that other considerations can be used to limit the navigation radius.

In an example, as renderer module 122 renders a textured three-dimensional model of a panorama in the three-dimensional environment, it may stretch the textures to fill areas for which extensive depth information may not be available. In this example, a consideration that may limit the navigation radius may be a predetermined threshold value corresponding to an acceptable amount of texture stretching that would be seen from remote locations. Path motion module 118 can then create a navigation or collision channel using the navigation radius of the panorama associated with the initial location of the virtual camera and the navigation radius of the panorama associated with the target location, as described in further detail below with respect to FIG. 2.

Figure 2:
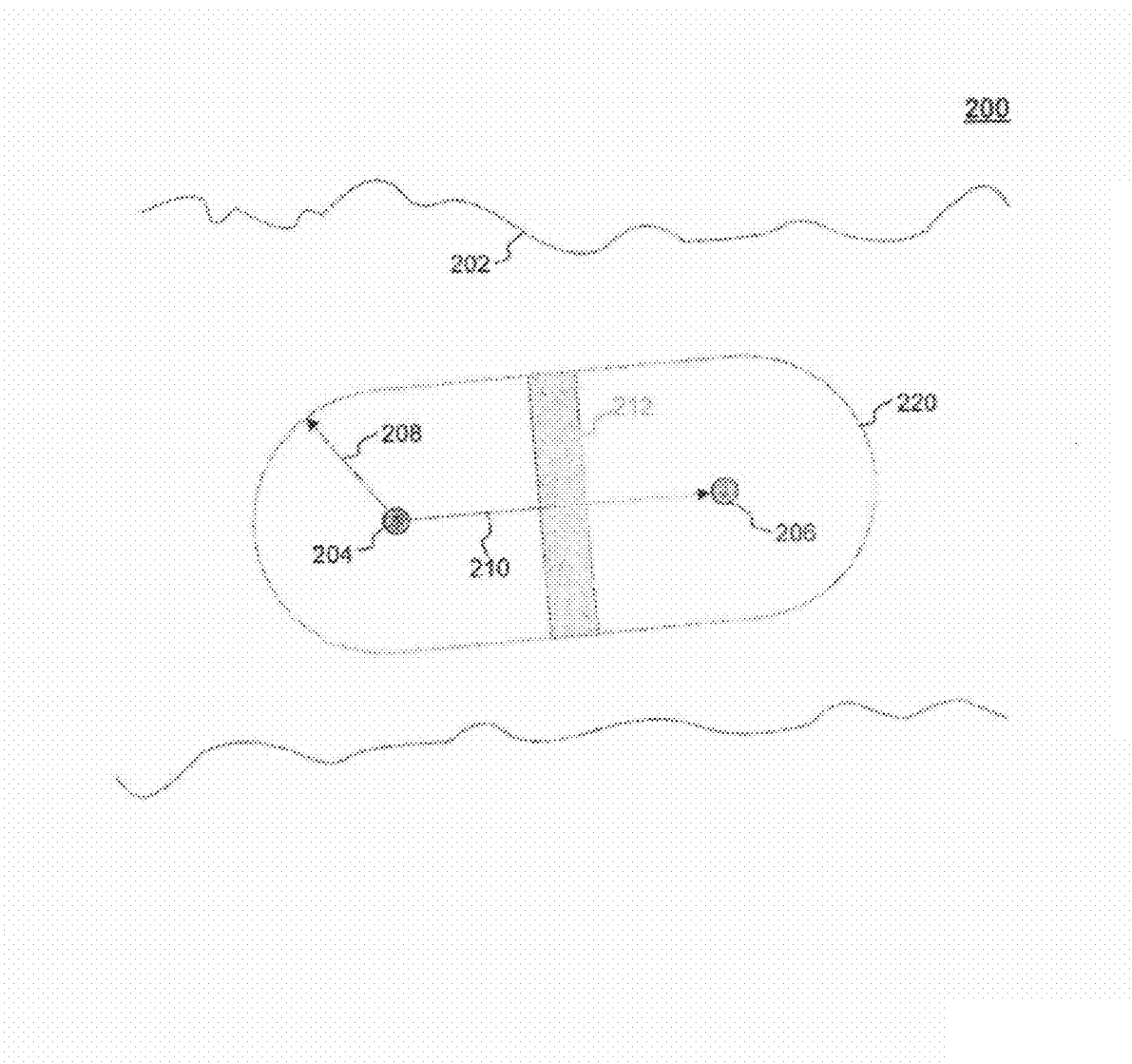
FIG. 2 is a diagram of an exemplary navigation channel within a depth mesh for guided navigation in a three-dimensional environment, according to an embodiment.

FIG. 2 is a diagram of an exemplary navigation channel 200 within a depth mesh 202 for guided navigation in a three-dimensional environment, according to an embodiment. In the example navigation channel shown in FIG. 2, a single connection links two panoramas along a path 210. Path 210 may represent, for example, a street in the three-dimensional environment. As shown in FIG. 2, path 210 extends from an initial position corresponding to a panorama center 204 (e.g., the center of the first panorama) to a target position corresponding to a panorama center 206 (e.g., the center of the second panorama).

Referring back to FIG. 1, path motion module 118 may be used to create a shell 220 within a depth mesh 202 relative to path 210. In an embodiment, path planner module 116 determines path 210 along a representation of a street in the three-dimensional environment. Referring back to the example navigation channel 200 of FIG. 2, path planner module 116 of FIG. 1 may be used to determine a path 210 along a representation of a street between panorama center 204 and a panorama center 206 in the three-dimensional environment.

Shell 220 of the navigation channel illustrated in FIG. 2 provides a constraint surface used for rendering portions of panoramic images in the three-dimensional environment.

Further, the constraint surface of the navigation channel defines a boundary beyond which navigation (e.g., movement of the virtual camera) in the three-dimensional environment is not allowed. Accordingly, this surface may be used as a hard-boundary for navigation in order to maintain the visual quality of the experience. As the user navigates in the three-dimensional environment and the actively rendered panorama changes, the constraint surface can be updated by path motion module 118 to account for the immediate neighborhood of the virtual camera.

In an embodiment, depth mesh 202 may be a three-dimensional watertight mesh of polygons generated by renderer module 122 based on the depth maps associated with the two panoramas, as described above. In an embodiment, path motion module 118 builds the shell by interpolating navigation spheres at each panorama along path 210 based on the calculated navigation radius of each panorama, as described above. For a visual example, if shell 220 were to be drawn in three-dimensional space and viewed from above, it would appear as a conical section, bounded by two spheres. Also as described above, each navigation sphere represents a region of "known-good" or acceptable viewpoints for each panorama within the three-dimensional environment.

In an embodiment, each panorama is geo-located. Thus, the locations of the panoramas in the virtual three-dimensional environment can correspond to geographic locations. In addition, movement of the virtual camera (e.g., based on user input) between different locations in the three-dimensional environment can correspond to movement between geographic locations in the GIS.

It is noted that FIG. 2 is presented for illustrative purposes only and that embodiments are not limited thereto. A person skilled in the relevant art given this description would appreciate that embodiments may be used for multiple panoramas linked together in a panorama graph. In an example, multiple panoramas may be associated with a representation of an intersection in the three-dimensional environment. The navigation channels of such multiple panoramas may intersect in unpredictable ways. Therefore, path motion module 118 may perform a series of collision tests using all possible navigation channels that are, for example, a predetermined number of links deep in the panorama or connectivity graph from the panorama being currently rendered (or "active panorama"). For example, path motion module 118 may construct the bounding geometry associated with a navigation channel for up to two panoramas from the active panorama. It would be apparent to a person skilled in the relevant art given this description that the navigation channels for any number of panoramas connected to the active panorama may be constructed as necessary. It is noted that the active panorama may also correspond to the current location of the virtual camera in the three-dimensional environment.

FIGS. 6A-B are diagrams 600A and 600B, respectively, illustrating the intersection of multiple navigation channels 601, 602, and 603, according to an embodiment. In the example shown in FIG. 6A, a shell having multiple branches is generated based on navigation channels 601-603. As shown in diagram 600A, each navigation channel represents each of three streets connected to the panorama corresponding to panorama center 620. Also as shown, navigation channels 601-603 (as branches of the shell) can include navigation fillets 614, 615, and 616, which act as "collision-free zones" as the virtual camera moves from one navigation or collision channel to another. Further, navigation fillets 614-616 have filleted edges (e.g., rounded corners). Such filleted edges can help to avoid the sharp corners associated with intersections, thereby providing for a smooth user experience during navigation. It is noted that embodiments may utilize various novel equations/algorithms for generating these rounded corners quickly.

In an embodiment, navigation fillets 614-616 are constructed by fitting a collision sphere 630 tangentially between two different navigation channels (e.g., navigation channels 611 and 612). For example, navigation fillet 614 may be parameterized according to the distances of points of tangency relative to panorama center 620. As shown in diagram 600A, the fillet width ("fw") of navigation fillet 614 may be computed, for example, by taking into account the navigation widths ("nw") corresponding to navigation channels 601 and 602.

Once fillets have been constructed around sharp intersections, as shown in diagram 600A, path motion module 118 can test for collision against the union of the constraint surfaces created by the navigation channels and fillets, as shown in diagram 600B of FIG. 6B, according to an embodiment. For example, such a union of constraint surfaces provided by the navigation channels in diagram 600B may represent the region of sufficient or acceptable visual quality, as described above, to which movement of the virtual camera may be constrained.

In an embodiment, path planner module 116 can determine the path to turn at an intersection in a representation of a street network in the three-dimensional environment. For example, at the turn, path planner module 116 may interpolate a spline at the turn in the path to smooth motion of the virtual camera.

Guided Navigation Using Navigation Channel Constraints

As described above, embodiments enable the virtual camera (and the user) to follow areas of good image quality as three-dimensional representations of panoramas are rendered in the three-dimensional environment. Also as described above, the panoramas provide ground level views of various scenes along one or more streets. Thus, the movement of the virtual camera follows representations of the streets in the three-dimensional environment. In an embodiment, path motion module 118 is further configured to facilitate such navigation based on user input, e.g., keyboard and/or mouse events (e.g., up arrow, right arrow, double-click, etc.). Consequently, path motion module 118 guides the virtual camera on a path along a representation of a street while alleviating any undue burden for the user to try to stay on-track by using navigation controls and/or additional user input.

For example, in conventional applications involving navigation in a three-dimensional environment, pressing the up-arrow key of a keyboard generally causes the virtual camera to move forward along its direction of travel. However, this behavior as applied to navigating panoramas in the three-dimensional environment as described herein may result in the virtual camera drifting off course. Consequently, the user may have to repeatedly use different keys to go down the street. To address these concerns, embodiments apply several different techniques, as will be described in further detail below.

In order to maintain the user experience of free-form navigation while helping to guide users towards areas of better visual quality, user interaction module 110 is operable to change the meaning associated with certain user input (e.g., the arrow keys of a keyboard). This enables embodiments to subtly guide the user along roads when, for example, a "follow-roads" gesture is detected, as described in more detail below. When such a "follow roads" gesture is activated, motion module 114 and/or path motion module 118 can be configured to apply corrections to the motion of the virtual camera.

In an embodiment, a view direction correction and a view position correction are applied to the motion of the virtual camera as it is moved along the path. The view position correction moves the virtual camera towards the center of the link between the panoramas. The view direction correction aligns the view of the virtual camera slightly more towards the center of the path. Further, once the gesture has been activated for a predetermined period of time, the view of the virtual camera can be moved back to the center of the path. The application of such view corrections enables the virtual camera to follow curving road networks.

It would be apparent to a person skilled in the relevant art given this description that such a "follow roads" gesture may be activated by a user in a number of ways. In one example, the user may continue to hold down, for example, the up-arrow key for a period of time without touching the left or right arrow keys, while a view direction of the virtual camera roughly corresponds to a path along the road direction. In other words, if the view direction of the virtual camera is along a street represented in the three-dimensional environment within a certain angular tolerance (e.g., 45 degrees), and the user depresses the up arrow key, the view will initially move the user forwards. However, after a period of time (e.g., 1.5 seconds), the "follow roads" gesture may be activated, and path motion module 118 can determine the intention of the user may be to move along the street.

In an embodiment, the magnitude of the view direction and/or view position correction applied by path motion module 118 can be smoothly parameterized based on user input. For example, a predetermined threshold value based on time may be used for such parameterization. In this example, when the "follow-roads" gesture is detected, the magnitude of any corrections may be smoothly ramped up over a few second to some predetermined maximum correction amount. Further, conflicting user input or camera positioning may cause a smooth ramp-down of any correction amount.

Upon activation of the gesture, path motion module 118 gradually aligns the view of the virtual camera towards the road, and moves the user towards the center of the road, in accordance with an embodiment. From the user's perspective, this experience may feel similar to driving a car. In an embodiment, path motion module 118 will automatically follow the curves in the road network represented in the three-dimensional environment. A user may counteract any automatic turns of the virtual camera by, for example, hitting the left-right arrow key. In this case, path motion module 118 can discontinue the automatic navigation and wait for some predetermined period of time before starting to correct the view. It would be apparent to a person skilled in the relevant art given this description that embodiments may use any number of methods to infer or predict the intention of the user to follow roads and thus, whether such a "follow roads" gesture should be activated.

As described above, path motion module 118 attempts to determine the intention of the user to turn a corner based on the view position and angle of the virtual camera. In an embodiment, path planner module 116 determines a specific path which will execute the turn onto the new street, facing the new street direction, at the center of the road. In an embodiment, path planner module 116 chooses the appropriate road and builds a new corresponding path dynamically, while also trying to detect whether the user wishes to discontinue to follow roads, as described above.

Further, once the detected user input (e.g., a long key-press) is determined to be a "follow-roads" gesture, path planner module 116 may also determine whether there is a panorama center (or region of increased visual quality, as described above) along the previous direction of motion of the virtual camera. Such a previous direction of motion may be, for example, within a certain tolerance based on the position of the panorama center (or region) and/or time to arrive at that position. If one is found, a short autopilot can be initiated such that the virtual camera remains moving close to the original direction for a short amount of time. This allows the view to arrive at a region of better visual quality. To the user, this may seem like a natural momentum decay or a "throw" gesture that may be found in some other well-known navigation systems, as would be apparent to a person skilled in the relevant art given this description. However, unlike these other systems, one of the goals for embodiments as described herein is to subtly guide the user towards the region of increased visual fidelity or quality, as described above.

Guided Navigation Use Cases

FIGS. 3A-E are diagrams 300A-E illustrating various possible use cases associated with subtly guiding a virtual camera (and user) towards and/or along street centers. Each of the diagrams shown in FIGS. 3A-E includes a road network of panoramas associated with an intersection. Further, each diagram includes a navigation channel radius 302 for each of the panoramas. For ease of explanation, navigation channel widths are not shown. In each of the diagrams, the view and path direction of a virtual camera is in the direction of an arrow associated with the virtual camera. A user may, for example, execute a "Move Forward" action (e.g., by selecting an arrow key, as described above).

Further, a person skilled in the relevant art given this description would appreciate that embodiments may employ any number of novel techniques to implement the desired movement of the virtual camera in the three-dimensional environment, as illustrated by diagrams 300A-E. For example, such techniques may involve constructing various curves to get to each intersection point and comparing the relative tension associated with these curves.

Figure 3A:
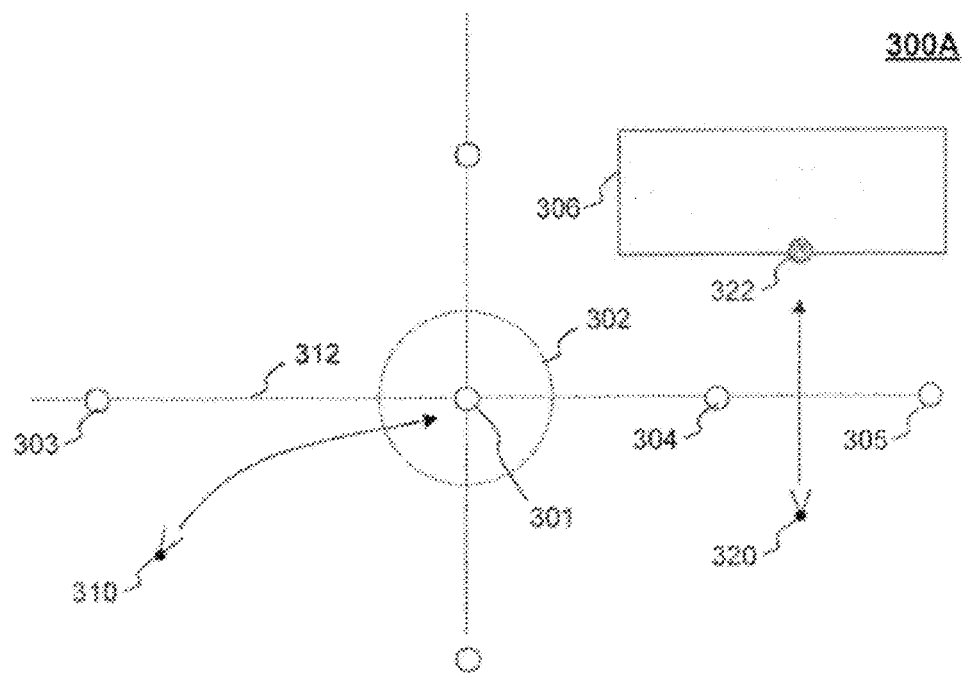
FIG. 3A is a diagram illustrating exemplary paths for virtual cameras approaching a connection between two panoramas at different angles, according to an embodiment.

FIG. 3A is a diagram 300A illustrating exemplary paths of a virtual camera 310 and a virtual camera 320 approaching a street 312 (represented as a centerline of the intersection in the example shown in FIGS. 3A-E) between two panoramas at different angles, according to an embodiment. The path of virtual camera 310 is approaching street 312 connecting a panorama center 301 and a panorama center 303 at a grazing angle. For example, this view direction may indicate that the user is interested in moving to a target position down street 312 rather than moving to a position across street 312. If no action is taken in regard to the movement of virtual camera 310, it would move past street 312, and navigate into an undesired location. A correction can therefore be taken to align the path of virtual camera 310 with street 312 in an "intercept course." If the user actually prefers to navigate past the street 312 to a specific target, the user can override the correction by using, for example, arrow keys on the user's keyboard or turning the view of virtual camera 310 to be more perpendicular to street 312, similar to the view direction of virtual camera 320, described below.

In contrast to virtual camera 310, virtual camera 320 is approaching street 312 between two panoramas represented by panorama centers 304 and 305, but at a nearly perpendicular angle. In this case, the user may be interested in viewing a target 322 (e.g., a facade of a building 306) located across the street from the viewpoint. If the path of virtual camera 320 were to be corrected so as to place it on an intercept course, as with virtual camera 310, the result may be more jarring to the user than is desirable. Thus, the view angle for virtual camera 320 should not be corrected so as to be aligned along street 312. If the user actually does prefer to move down street 312, the user can align the view direction of virtual camera 320 similar to that of virtual camera 310 by manually overriding guided navigation through user input.

Figure 3B:
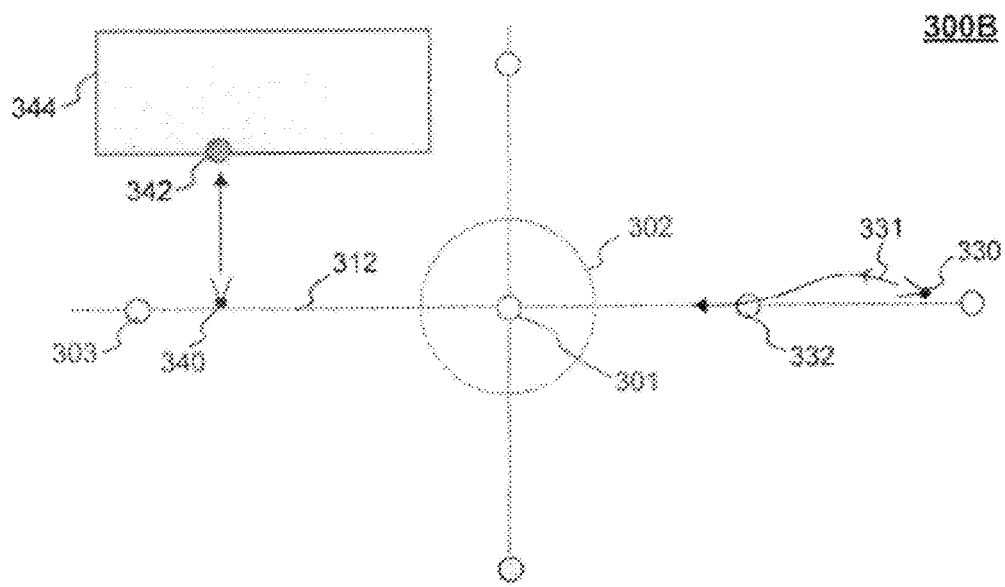
FIG. 3B is a diagram illustrating exemplary paths for virtual cameras leaving a connection between two panoramas at different angles, according to an embodiment.

FIG. 3B is a diagram 300B illustrating exemplary paths of a virtual camera 330 and a virtual camera 340 moving away from street 312, at different angles, according to an embodiment. In this example, the path for virtual camera 340 is similar to that of virtual camera 320 of FIG. 3A (i.e., toward a target location 342). However, the path for virtual camera 330 initially deviates from street 312 (the centerline) at a relatively small angle (e.g., as shown by initial path 331). As with virtual camera 310 of FIG. 3A, the path of virtual camera 330 is corrected so that it aligns along street 312. If the user is interested in a building outside the navigation channel, they can override the correction by inputting, for example, the appropriate keystrokes or by turning the viewpoint to a more perpendicular angle with the road via, for example, navigation controls.

Figure 3C:
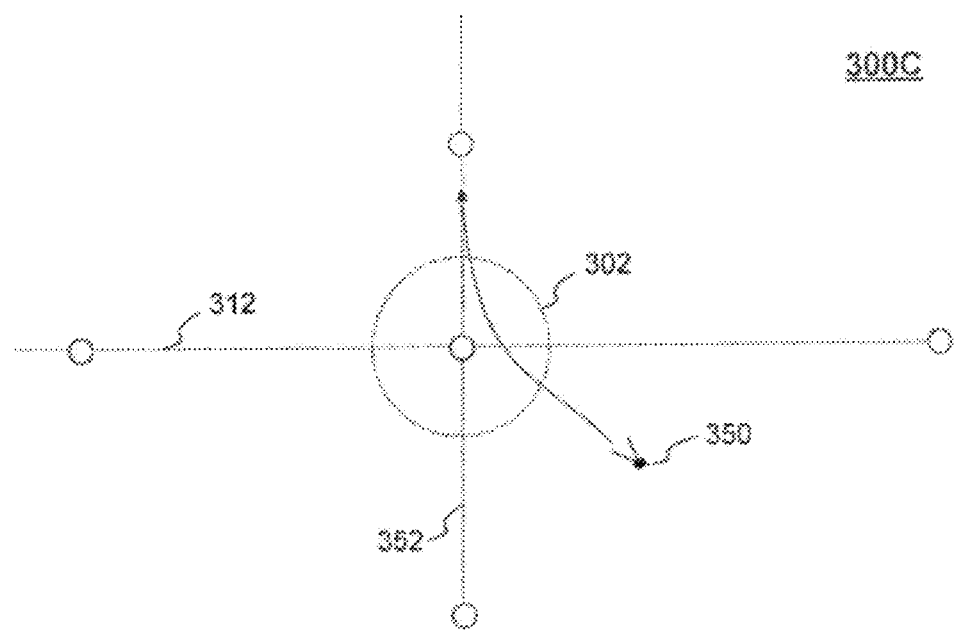
FIG. 3C is a diagram illustrating an exemplary path for a virtual camera aligning with a street across an intersection, according to an embodiment.

FIG. 3C is a diagram 300C illustrating an exemplary path for a virtual camera 350 aligning with a street 352 across an intersection, according to an embodiment. It may be assumed that the virtual camera 350's view-direction subtends an equal angle with respect to both streets 312 and 352. Although it may seem obvious from diagram 300C that the path of virtual camera 350 should be aligned with street 352, the angle of incidence of the path illustrated in the diagram may not be sufficient for alignment with street 352. Rather, given a fixed forward velocity, the street (352) along which virtual camera 350 should be aligned requires a minimum rate of turn, even if it requires a greater total angular deviation. Thus, rate-of-turn metrics may be utilized to select the appropriate street for path alignment based on the street that produces the minimum rate of turn relative to other streets.

Figure 3D:
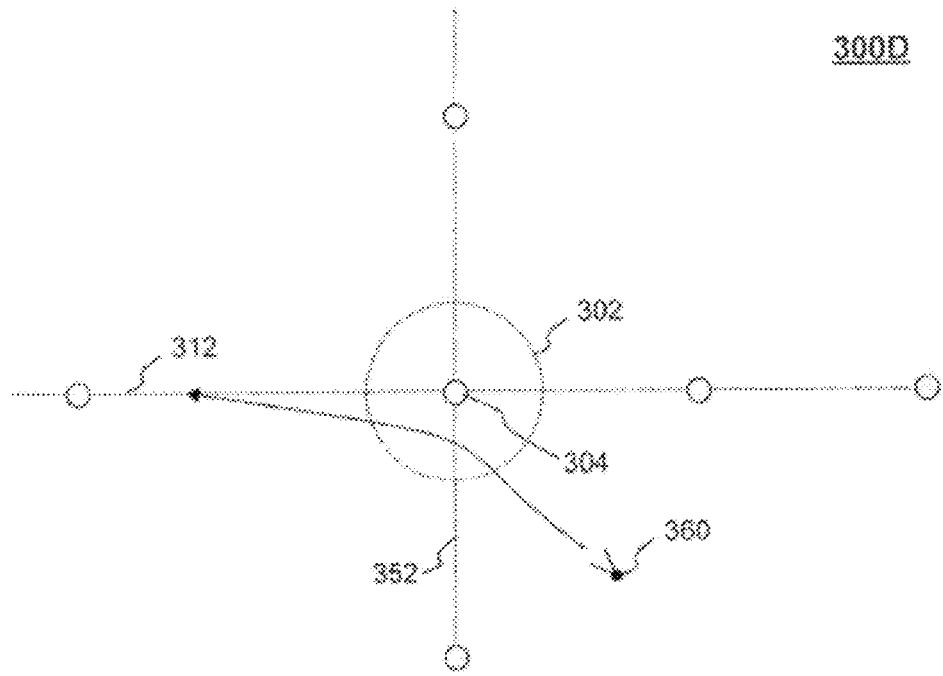
FIG. 3D is a diagram illustrating an exemplary path for a virtual camera aligning with different streets in an intersection, according to an embodiment.
Figure 3E:
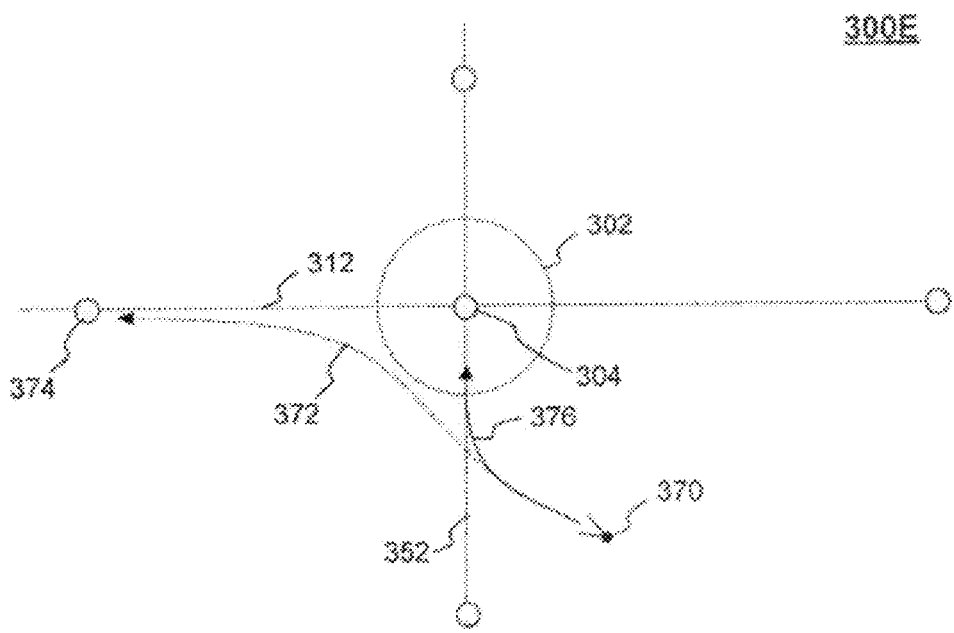
FIG. 3E is another diagram illustrating an exemplary path for a virtual camera aligning with different streets in an intersection, according to an embodiment.

FIGS. 3D and 3E elucidate the interaction of navigation channel radius 302 with the guided navigation correction. FIG. 3D is a diagram 300D illustrating an exemplary path for a virtual camera 360 aligning with different streets in an intersection, according to an embodiment. FIG. 3E is a diagram 300E illustrating an exemplary path for a virtual camera 370 aligning with different streets in an intersection, according to an embodiment.

Based on the view direction of both virtual cameras 360 and 370, the target paths for both correspond to street 312, which is located at a greater distance (e.g., relative to the distance of the initial position to street 352) from the initial position of each virtual camera as shown in diagrams 300D and 300E, respectively. As shown in each diagram, the path for virtual camera 360 is corrected to the farther street (312) based on its current view direction. On the other hand, the path for virtual camera 370 is not corrected to target this farther street and is instead guided along street 352. The difference between the path of virtual camera 360 and the path of virtual camera 370 is the allowed distance deviation from the navigation channel radius 302. For example, if virtual camera 370 were to be corrected to street 312, then the viewport used to display the three-dimensional environment from the perspective of the virtual camera would deviate outside of the allowed navigation channel (e.g., as illustrated by navigation channel 200 of FIG. 2, described above). Navigation outside the navigation channel may result in poor or undesirable views that may be disallowed. Consequently, virtual camera 370 is corrected to street 352, which is closer in distance to this virtual camera's initial position.

Automatic Alignment with Roads and Panoramas

In an example, the virtual camera may have an initial position corresponding to an aerial perspective of the Earth. In an embodiment, the user may select a target corresponding to a geographical location on the Earth by selecting an appropriate position within three-dimensional environment. The virtual camera may then incrementally zoom down to a lower altitude based on the selected target. A threshold altitude near ground-level may be reached that can be used to infer that the user intends to view ground-level objects up close. For example, near ground-level, where satellite imagery may become blurry or less useful, several factors may be taken into account to infer such user intent. Such factors can include, but are not limited to, proximity to the ground, the motion of the virtual camera, and user input (e.g., mouse movements).

In an embodiment, path motion module 118 maintains spatial awareness throughout the transition from the aerial perspective to the ground-level perspective and places the virtual camera in a useful position that maintains a maximum amount of visual context. In an embodiment, path planner module 116 may automatically place the virtual camera (e.g., via an autopilot path) in an initial position corresponding to the center of a panorama in order to ensure that maximum visual quality is maintained. To prevent image objects (e.g., a building), which may be located at the determined initial position, from obscuring the initial view and disorienting the user, a simple autopilot path to that position may not be sufficient. Accordingly, the connectivity or panorama graph, as described above, can be used to reorient the view of the virtual camera to look along the road direction to a nearby panorama whose view is not obstructed by image objects. Looking along the road maximizes the visual continuity between the aerial "Earth" view and the street or ground level view rendering experiences while providing the user more visual context. Further, the reorientation of the virtual camera performed by path motion module 118 can occur gradually so as not to disorient the user.

As the road network may be unknown to path planner module 116 when the perspective of the virtual camera needs to changed to a street level view, autopilot navigation can be immediately initiated to a target location in the three-dimensional environment determined by, for example, target module 112. In addition, motion model 114 can initiate a set of fetches or requests to server 140 over network 130 for panorama data associated with the target location, including panorama data for locations near the target location. When those fetches return, target module 112 may determine the nearest panorama to the target location, and further choose the determined panorama as the autopilot destination. In an example, the selection of the panorama may be based on whether it is located within a certain distance threshold of the determined target location. In another example, the selection of the best panorama to be displayed for a target location may be determined by weighing several factors including, but not limited to, the proximity of the target position to the location associated with the panorama in the three-dimensional environment and the angular deviation of the virtual camera to face the target from the current position.

Path planner module 116 can then calculate the street direction(s) from the panorama connectivity information associated with the panorama and received from server 140. Based on the current view direction, path planner module 116 can choose the closest street and the proper view direction down a street represented in the three-dimensional environment so as to minimize the angular rotation applied to the view. As soon as this information is known, path motion module 118 can begin to rotate the view of the virtual camera to align with the street.

It would be apparent to a person skilled in the relevant art given this description that embodiments can also be configured to handle any additional complications that may arise during this process. For example, subsequent outstanding fetches for panoramas may reveal a closer panorama than initially determined. In another example, another street may exist that was previously unknown to user interaction module 110. Therefore, embodiments of user interaction module 110, including its components, are operable to dynamically update the autopilot destination and orientation so as to account for such complications without disorienting the user.

Method

Figure 4:
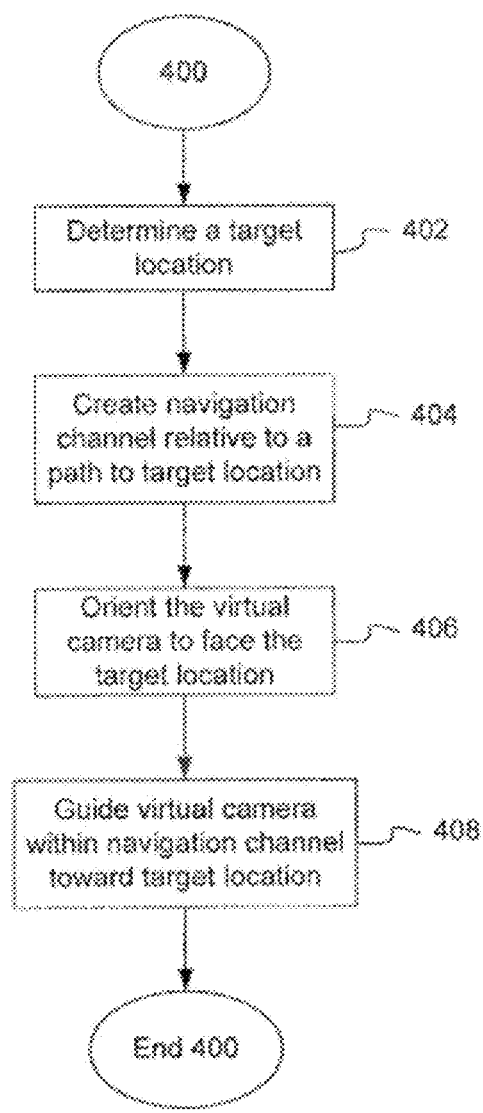
FIG. 4 is a flowchart of a method for guided navigation of a virtual camera along a street network toward a target, according to an embodiment.

FIG. 4 is a flowchart illustrating a method 400 for guided navigation of a virtual camera along a street network toward a target, according to an embodiment. For ease of explanation, method 400 is described with respect to system 100 of FIG. 1, described above. However, method 400 is not intended to be limited thereto.

Method 400 begins by determining a target at a step 402. The target may be any point or region in the three-dimensional environment. In an example, the three-dimensional environment may include a plurality of models and the target may be a model or a position on a model. A user may specify a target location. For example, a user may enter in an address or coordinates to specify a location in the three dimensional environment. In an embodiment, the location may be at ground- or street-level.

In an example, a user may select a position in a viewport displaying the three-dimensional environment from the perspective of the virtual camera. The GIS may receive position data representing a position on a viewport selected by a user. The GIS may determine a point in the three-dimensional environment based on the position selected by the user and a focal length of the virtual camera. In an example, the distance between the determined point and the focal point may correspond to the focal length of the virtual camera.

Once the point in the three-dimensional environment is determined based on the position selected by the user, the GIS may extend a ray based on the position selected by the user. In an example, the GIS may extend the ray from a focal point or entrance pupil of the virtual camera. The ray may extend from the focal point or entrance pupil through the determined point.

With a ray extended, the target location may be determined based on the ray. In an embodiment, the three-dimensional model may include a plurality of models, such as building models. In that embodiment, the target location may be determined to be the intersection of the ray with a model in the three-dimensional environment. In this way, a target location may be determined based on a user selection in a viewport.

Once the target location is determined at step 402, a navigation channel relative to a path to the target location is generated at step 404. The path may be, for example, along a street network represented in the three-dimensional environment. Further, the path may be between locations corresponding to centers of panoramas rendered as three-dimensional models in the three-dimensional environment, as described above. The navigation channel defines a constraint surface and navigation boundary for the movement of a virtual camera within the three-dimensional environment, also as described above. In an example, a panoramic photograph may be located at each point in the series of points, and the panoramic photographs may be linked to each other in a panorama or connectivity graph based on connectivity information associated with each panorama. For example, when the virtual camera is located at a particular point, the GIS may display the photographic image data from the perspective of the virtual camera.

The path may guide the virtual camera close to the target location. For example, the path may guide the virtual camera to the position in the street network closest to the target location. Alternatively and additionally, the path may be determined such that it does not exceed a maximum distance (e.g., a maximum roaming distance relative to a center of a panorama).

As the virtual camera is moved along the path within the navigation channel, it may be oriented to face the target location in step 406. In step 408, the virtual camera may be automatically guided within the navigation channel toward the target location based on several factors including, but not limited to, a view direction and position of the virtual camera in the three-dimensional environment, as described above. Further, a user may override any automatic guidance through user input, also as described above.

As the virtual camera is moved closer to the target location, a scene corresponding to the target location can be rendered and displayed to the user. In an embodiment, step 408 further includes selecting a panorama to be displayed based on the target location. However, the selection of the appropriate panorama may not simply be based solely on the proximity of a panorama to the target location. Another important factor may be, for example, the viewing angle at which the virtual camera must be moved in order to keep the target in view. For example, the closest panorama may be further along the road than the target; however, to keep the target in view, the virtual camera would have to swing around and face nearly backwards. Accordingly, the selected panorama is the one closest to the virtual camera's initial position, or origin, but also located far enough from the target location in the three-dimensional environment such that the amount of camera rotation is minimized.

Example Computer System Implementation

Embodiments shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
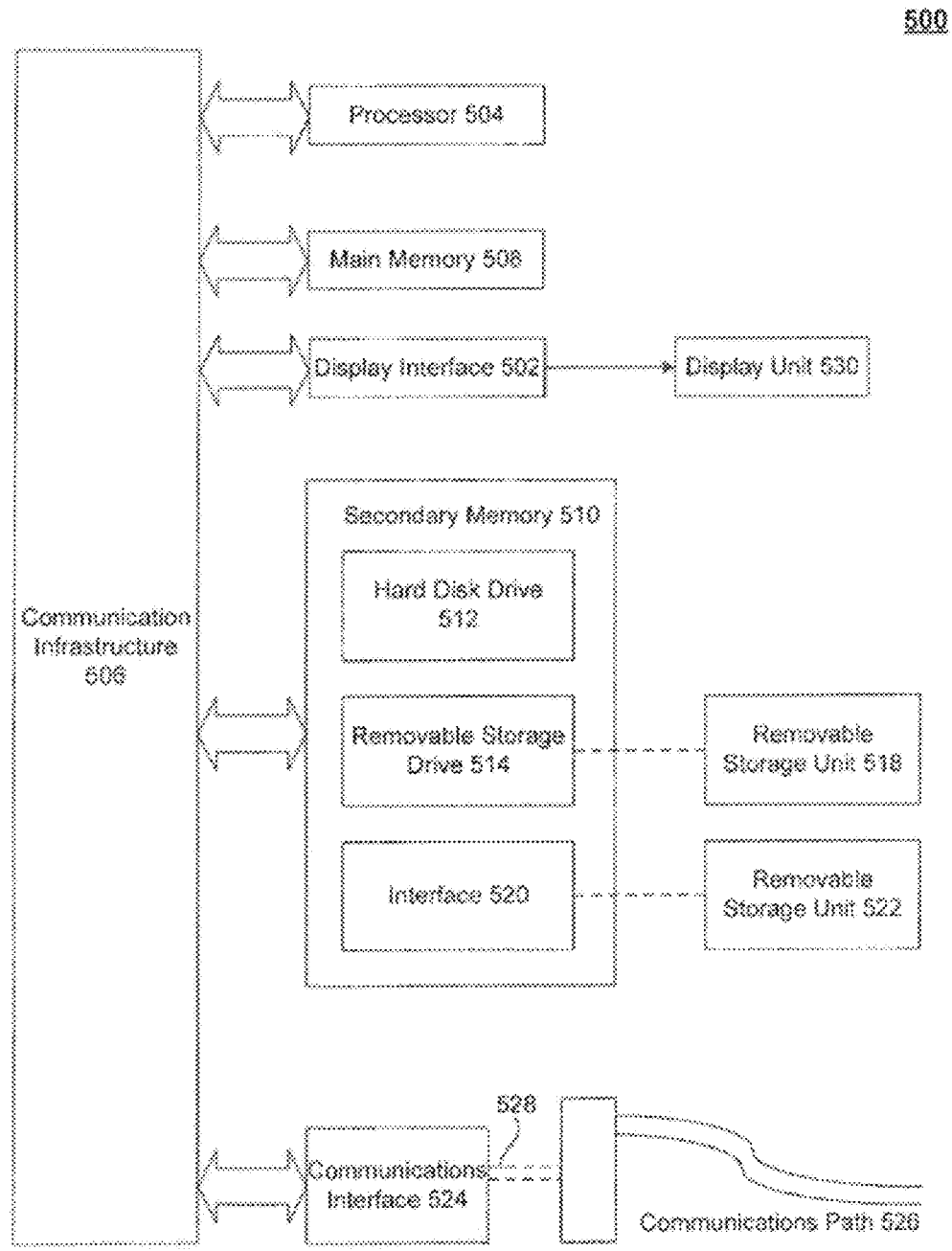
FIG. 5 is a diagram of an exemplary computer system in which embodiments can be implemented.

FIG. 5 illustrates an example computer system 500 in which embodiments, or portions thereof, may be implemented as computer-readable code. For example, client 102 in FIG. 1 can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512 and a removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement embodiments as discussed herein. In particular, the computer programs, when executed, enable processor device 504 to implement the processes of embodiments of the present invention, such as the stages in the methods illustrated by flowchart 400 of FIG. 4, discussed above. Accordingly, such computer programs represent controllers of the computer system 500. Where embodiments are implemented using software, the software may be stored in a computer program product and loaded into computer system 500 using removable storage drive 514, interface 520, hard disk drive 512, or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

CONCLUSION

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for guided navigation in three-dimensional environments, comprising:
    displaying, by one or more computing devices, a first three-dimensional representation of a panoramic image within a three-dimensional environment from a viewpoint of a virtual camera;
    identifying, by the one or more computing devices, one or more additional panoramic images linked to the first panoramic image based on metadata associated with the first panoramic image;
    determining, by the one or more computing devices, a region of visual quality that satisfies a criteria associated with a visual representation for each of the first panoramic image and the one or lore additional panoramic images within the three-dimensional environment;
    generating, by the one or more computing devices, one or more navigation channels relative to a path between the first panoramic image and the one or more additional panoramic images based on each region of visual quality, wherein each navigation channel has a rendering surface that constrains movement of the virtual camera within the region of visual quality in a bounded volume of space defined by the navigation channel; and
    constructing, by the one or more computing devices, a navigation fillet around an intersection of the one or more navigation channels by fitting a collision sphere tangentially between different navigation channels of the one or more navigation channels, such that the navigation fillet represents a collision free zone and is parameterized according to distances of points of tangency relative to a center of one of the first panoramic images; and
    in response to an input event indicating a desired movement of the virtual camera to a location in a second panoramic image of the one or more additional panoramic images, repositioning, by the one or more computing devices, the virtual camera in the three-dimensional environment along the path, within the collision free zone, from a first position associated with the first panoramic image toward a second position associated with the second panoramic image of the one or more additional panoramic images based on the input event, wherein moving comprises preventing movement of the virtual camera outside the region of visual quality in the bounded volume of space defined by the navigation channel even if the location indicated by the input event is outside the navigation channel.

2. The method of claim 1, wherein determining a region of visual quality comprises:
    calculating a navigation radius for each of the first panoramic image and the one or more additional panoramic images based on a depth map associated with each of the panoramic images, wherein the navigation radius represents the region of visual quality for each of the panoramic images within the three-dimensional environment.

3. The method of claim 2 further comprising:
    constructing a shell around each navigation channel based on interpolating a navigation sphere for each panoramic image along the path and the calculated navigation radius of each panoramic image, the shell defining a boundary for movement of the virtual camera within the three-dimensional environment.

4. The method of claim 1, further comprising:
    generating a three-dimensional mesh of polygons for the first panoramic image and the one or more additional panoramic images based on depth values associated with image objects in each respective panoramic image.

5. The method of claim 4, further comprising:
    determining first and second positions in the three-dimensional mesh corresponding to centers of each of the first and second panoramic images, wherein the first and second positions correspond to an accurate viewpoint of the image objects in the first and second panoramic images; and
    calculating the navigation radius for each of the first and second panoramic images in the three-dimensional mesh based on the determined region of visual quality of each of the first and second panoramic images.

6. The method of claim 4, further comprising:
    rendering a first portion of the three-dimensional mesh corresponding to the first panoramic image in the three-dimensional environment from a perspective of the virtual camera;
    automatically rendering a second portion of the three-dimensional mesh corresponding to the second panoramic image within the three-dimensional environment as the virtual camera is moved along the path from the initial position to the target position; and
    blending the second portion of the first three-dimensional mesh as it is rendered with the rendered first portion in the three-dimensional environment.

7. The method of claim 6, wherein the rendering of the first portion comprises:
    rendering the first portion of the three-dimensional mesh within the three-dimensional environment according to a first texture based on the first panoramic image,
    wherein the automatically rendering the second portion comprises:
        automatically rendering the second portion of the three-dimensional mesh within the three-dimensional environment according to a second texture based on the second panoramic image, and
    wherein the blending comprises:
        blending the first texture and the second texture based on a blending parameter as second 3D mesh is rendered.

8. The method of claim 1, wherein the first panoramic image and the one or more additional panoramic images are associated with a network of streets in the three-dimensional environment.

9. The method of claim 8 further comprising:
    determining a path to turn at an intersection within the associated network of streets in the three dimensional environment.

10. The method of claim 1, wherein the first panoramic image and the one or more additional panoramic images are geo-located, and the first and second positions associated with the respective first and second panoramic images within the three-dimensional environment correspond to geographic locations in a geographic information system (GIS).

11. The method of claim 1, further comprising:
    dynamically updating the rendering surface of the navigation channel as the virtual camera is moved in the three-dimensional environment.

12. The method of claim 1, wherein the moving comprises:
    determining a target location associated with the second panoramic image in the three-dimensional environment based on a view direction of a virtual camera;
    moving the virtual camera within the navigation channel from the first position corresponding to an initial location associated with the first panoramic image toward the second position corresponding to the determined target location; and aligning the view direction of the virtual camera toward the target location as the virtual camera is moved along the path, the aligning based on a minimum correction angle.

13. The method of claim 12, wherein the aligning further comprises:
applying a view direction correction and a view position correction as the virtual camera is moved in the three-dimensional environment based on an alignment for the view direction of the virtual camera relative to the path and a parameterization of a magnitude of the view direction correction and the view position correction.

14. The method of claim 13, wherein the magnitude of the view direction correction and view position correction is smoothly parameterized based on user input.

15. The method of claim 12, wherein the determined target location is a center of the first and second panoramic images.

16. A system for guided navigation in three-dimensional environments, comprising:
a renderer module, implemented on a computing device and configured to display a first three-dimensional representation of a first panoramic image within a three-dimensional environment from a viewpoint of a virtual camera and identify one or more additional panoramic images linked to the first panoramic image based on metadata associated with the first panoramic image;
a path planner module, implemented on the computing device and configured to determine a region of visual quality that satisfies a criteria associated with a visual representation for each of the first panoramic image and the one or more additional panoramic images within the three-dimensional environment; and
a path motion module, implemented on the computing device and configured to (i) generate one or more navigation channels relative to a path between the first panoramic image and the one or more additional panoramic images based on each region of visual quality, wherein each navigation channel has a rendering surface that constrains movement of the virtual camera within the region of visual quality, (ii) construct a navigation fillet around an intersection of the one or more navigation channels by fitting a collision sphere tangentially between different navigation channels of the one or more navigation channels, such that the navigation fillet represents a collision free zone and is parameterized according to distances of points of tangency relative to a center of one of the first panoramic images, and (iii) reposition the virtual camera in the three-dimensional environment along the path, within the collision free zone, from a first position associated with the first panoramic image toward a second position associated with a second panoramic image of the one or more additional panoramic images based on user input, the path motion nodule further configured to, in response to an input event indicating a desired movement of the virtual camera outside a bounded volume of space defined by each navigation channel, move the virtual camera along one of the one or more navigation channels instead.

17. The system of claim 16, wherein the path planner module is further configured to calculate a navigation radius for each of the first panoramic image and the one or more additional panoramic images based on a depth map associated with each panoramic image, wherein the navigation radius represents the region of visual quality for each panoramic image within the three-dimensional environment.

18. The system of claim 17, wherein the path planner module is further configured to construct a shell around each navigation channel based on interpolating a navigation sphere for each panoramic image along the path and the calculated navigation radius of each panoramic image, the shell defining a boundary for movement of the virtual camera within the three-dimensional environment.

19. The system of claim 16, wherein the renderer module is further configured to generate a three-dimensional mesh of polygons for the first panoramic image and the one or more additional panoramic images based on depth values associated with image objects in each respective panoramic image.

20. The system of claim 16, wherein the renderer module is further configured to dynamically update the rendering surface of the navigation channel as the virtual camera is moved in the three-dimensional environment.

21. The system of claim 19, wherein the path planner module is further configured to determine first and second positions in the three-dimensional mesh corresponding to centers of each of the first and second panoramic images, wherein the first and second positions correspond to an accurate viewpoint of the image objects in the first and second panoramic images, and calculate the navigation radius for each of the first and second panoramic images in the three-dimensional mesh based on the determined region of visual quality of each of the first and second panoramic images.

22. The system of claim 19, wherein the renderer module is further configured to:
render a first portion of the three-dimensional mesh corresponding to the first panoramic image in the three-dimensional environment from a perspective of the virtual camera;
automatically render a second portion of the three-dimensional mesh corresponding to the second panoramic image within the three-dimensional environment as the virtual camera is moved along the path from the initial position to the target position; and blend the second portion of the first three-dimensional mesh as it is rendered with the rendered first portion in the three-dimensional environment.

23. The system of claim 22, wherein the renderer module is further configured to render the first portion of the three-dimensional mesh within the three-dimensional environment according to a first texture based on the first panoramic image, automatically render the second portion of the three-dimensional mesh within the three-dimensional environment according to a second texture based on the second panoramic image, and blend the first texture and the second texture based on a blending parameter as second 3D mesh is rendered.

24. The system of claim 16, wherein the first panoramic image and the one or more additional panoramic images are associated with a network of streets in the three-dimensional environment.

25. The system of claim 24, wherein the path planner module is further configured to
determine a path to turn at an intersection within the associated network of streets in the three dimensional environment.

26. The system of claim 16, wherein the path motion module is further configured to determine a target location associated with second panoramic image in the three-dimensional environment based on a view direction of a virtual camera, move the virtual camera within the navigation channel from the first position corresponding to an initial location associated with the first panoramic image toward the second position corresponding to the determined target location, and align the view direction of the virtual camera toward the target location as the virtual camera is moved along the path.

27. The system of claim 26, wherein the path motion module is further configured to apply a view direction correction and a view position correction as the virtual camera is moved in the three-dimensional environment based on an alignment for the view direction of the virtual camera relative to the path and a parameterization of a magnitude of the view direction correction and the view position correction.

* * * * *